US008730223B2

(12) United States Patent
Kim et al.

(10) Patent No.: US 8,730,223 B2
(45) Date of Patent: May 20, 2014

(54) SOURCE DRIVER AND DISPLAY DEVICE HAVING THE SAME

(75) Inventors: Cheol Min Kim, Seongnam-Si (KR); Oh Kyong Kwon, Seoul (KR); Jae Beom Choi, Suwon-Si (KR); Won Chang Chung, Seoul (KR); Joon Ha Park, Busan (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1552 days.

(21) Appl. No.: 11/929,444

(22) Filed: Oct. 30, 2007

(65) Prior Publication Data

US 2008/0291190 A1 Nov. 27, 2008

(30) Foreign Application Priority Data

May 22, 2007 (KR) ........................ 10-2007-0049533

(51) Int. Cl.
*G06F 3/038* (2013.01)
*G09G 5/00* (2006.01)
*G09G 5/10* (2006.01)

(52) U.S. Cl.
USPC ............................ 345/211; 345/204; 345/690

(58) Field of Classification Search
USPC .................................. 345/204–215, 690–699
See application file for complete search history.

(56) References Cited

U.S. PATENT DOCUMENTS

| | | | | |
|---|---|---|---|---|
| 2002/0027551 | A1 * | 3/2002 | Nitta et al. | 345/204 |
| 2003/0025659 | A1 * | 2/2003 | Kondo et al. | 345/87 |
| 2003/0137526 | A1 * | 7/2003 | Sakaguchi | 345/690 |
| 2005/0057580 | A1 * | 3/2005 | Yamano et al. | 345/690 |
| 2005/0062163 | A1 * | 3/2005 | Forbes | 257/758 |
| 2006/0198009 | A1 * | 9/2006 | Morita | 359/245 |
| 2008/0036715 | A1 * | 2/2008 | Lee et al. | 345/87 |

FOREIGN PATENT DOCUMENTS

| | | |
|---|---|---|
| JP | 2002250908 | 9/2002 |
| JP | 2004165749 | 6/2004 |
| JP | 2005010276 | 1/2005 |
| JP | 2005234495 | 9/2005 |
| JP | 2005292856 | 10/2005 |
| JP | 2006235368 | 9/2006 |
| JP | 2006276114 | 10/2006 |
| KR | 1020020017318 | 3/2002 |
| KR | 1020040000981 | 1/2004 |
| KR | 1020040061902 | 7/2004 |
| KR | 1020040085499 | 10/2004 |
| KR | 1020060079720 | 7/2006 |

* cited by examiner

*Primary Examiner* — Charles V Hicks
(74) *Attorney, Agent, or Firm* — F. Chau & Associates, LLC

(57) ABSTRACT

A source driver includes a gamma reference voltage generating unit and a gamma signal supplying unit. The gamma reference voltage generating unit generates a plurality of gamma reference voltages in response to a gamma control signal. The gamma signal supplying unit is integrated into a display panel and provides a gamma signal to data lines of the display panel using the gamma reference voltages.

13 Claims, 6 Drawing Sheets

SOURCE DRIVER AND DISPLAY DEVICE HAVING THE SAME

CROSS-REFERENCE TO RELATED PATENT APPLICATION

This application claims priority under 35 U.S.C. 119 to Korean Patent application No. 10-2007-0049533, filed on May 22, 2007, the disclosure of which is herein incorporated by reference in its entirety.

BACKGROUND OF THE INVENTION

1. Technical Field

The present disclosure relates to a source driver and a display device having the same, and more particularly, to a source driver and a display device having the same for controlling gamma voltage.

2. Discussion of Related Art

Demand for flat panel display devices have rapidly increased because portable electronic devices are increasingly required to include a multimedia function. A thin film transistor liquid crystal display (TFT-LCD) device is a flat panel display device that has been widely used as a display device for portable electronic devices because of its light weight and low power consumption.

To be competitive in the current display market, it is desirable that the TFT-LCD device be of a high definition and a low price. The price of a TFT-LCD device can be reduced by reducing manufacturing costs through increased yields and use of less expensive components.

Various methods can be used to reduce the manufacturing cost of a TFT-LCD device. In one method, a process of fabricating the liquid crystal display (LCD) device is simplified. For example, thin film transistors in a display panel may be fabricated using amorphous silicon (a-Si:H) to reduce the number of masks. The amorphous silicon can be crystallized using a low-temperature poly silicon (LTPS) process to improve mobility of amorphous silicon. The LTPS process enables fabrication of thin film transistors having better carrier mobility compared to the amorphous silicon on an amorphous glass substrate. The process also enables circuits such as a gate driving unit and a source driving unit to be formed of a plurality of such thin film transistors and integrated inside a display panel.

Integration of such circuits on a glass substrate of the display panel can simplify the manufacturing process of the TFT-LCD device and reduce a manufacturing cost as well.

However, when the thin film transistor is fabricated using the LTPS process, threshold voltage and mobility are nonuniform and a kink effect takes place, thereby making it difficult to implement an analog circuit generating accurate voltage or current. Furthermore, when a source driving unit is integrated into a device other than the TFT-LCD device, an analog circuit of the source driving unit may need to be redesigned according to characteristics of a particular panel.

Thus, there is a need for a source driver and a display device having the same that generates more accurate current and/or voltage while reducing manufacturing costs.

SUMMARY OF THE INVENTION

According to an exemplary embodiment of the present invention, a source driver includes a gamma reference voltage generating unit and gamma signal supplying unit. The gamma reference voltage generating unit generates a plurality of gamma reference voltages in response to a gamma control signal. The gamma signal supplying unit is integrated into a display panel and provides a gamma signal to data lines of the display panel using the gamma reference voltages. The gamma reference voltage generating unit may be fabricated as a chip and mounted on the display panel. The gamma reference voltage generating unit made by discrete electrical elements may be formed on a printed circuit board electrically connected to the display panel.

The gamma reference voltage generating unit may include a gamma controller for supplying the gamma control signal, at least one voltage generator for outputting different gamma reference voltages based on a reference voltage and the gamma control signal, and at least one output buffer for outputting the plurality of gamma reference voltages. The source driver may further include a reference voltage supplier for supplying the reference voltage.

The voltage generator may include a blue voltage generator for outputting a blue gamma reference voltage, a green voltage generator for outputting a green gamma reference voltage, and a red voltage generator for outputting a red gamma reference voltage. The voltage generator may include an amplifier for adjusting a voltage level of the reference voltage, and a gain controller for controlling a gain of the amplifier in response to the gamma control signal.

The voltage generator may include an amplifier including a non-inversion input terminal for receiving the reference voltage and an output terminal for outputting the gamma reference voltage, and a gain controller for controlling a gain of the amplifier in response to the gamma control signal including first and second variable resistors connected between a ground and the output terminal of the analog amplifier and having resistances adjusted in response to the gamma control signal. The amplifier further includes an inversion input terminal connected to a connection node between the first and second variable resistors. Each of the first and the second variable resistors may include a plurality of resistors connected in series and a plurality of switches connected in parallel to at least one of the plurality of resistors. The switches are turned on and off in response to the gamma control signal. The output buffer may be a unit gain buffer.

The gamma signal supplying unit may include a gamma voltage generator for generating a gamma voltage based on the gamma reference voltage and a digital-to-analog converter for supplying the gamma signal to the data lines of the display panel using the gamma voltage and pixel data.

The source driver may further include a shift register and a latch. The shift register generates a sampling signal. The latch samples the pixel data synchronized with the sampling signal and latches the pixel data in correspondence to the data lines to provide the pixel data to the digital-to-analog converter.

According to an exemplary embodiment of the present invention, a display device includes a display panel, a gate driver, a source driver, signal control unit, and a driving voltage generating unit. The display panel has a plurality of gate lines and a plurality of data lines. The gate driver sequentially supplies a gate turn-on voltage to the plurality of gate lines. The source driver includes a gamma reference voltage generating unit and a gamma signal supplying unit. The driving voltage generating unit supply driving voltages to the gate driver and source driver. The gamma reference voltage generating unit generates a plurality of gamma reference voltages in response to a gamma control signal. The gamma signal supplying unit is integrated into the display panel and provides a gamma signal to the plurality of data lines using the gamma reference voltages.

The display device may include a printed circuit board electrically connected with the display panel. The gamma reference voltage generating unit and the signal control unit are provided on the printed circuit board. The gamma reference voltage generating unit may be fabricated as a chip and mounted on the display panel.

The display panel may include a lower substrate, an upper substrate, and a liquid crystal layer interposed between the lower substrate and the upper substrate. The lower substrate has the plurality of gate lines and the plurality of data lines, a plurality of thin film transistors connected to the gate and data lines, and pixel electrodes connected to the plurality of thin film transistors. The upper substrate has a common electrode facing the pixel electrodes. The gate driver and the gamma signal supplying unit may be formed on the lower substrate.

According to an exemplary embodiment of the present invention, a method for driving a display device includes generating a gamma reference voltage based on a reference voltage and a gamma control signal, generating a gamma voltage using the gamma reference voltage, and supplying the gamma signal to the plurality of data lines using pixel data and the gamma voltage. The display device displays an image by sequentially supplying a gate turn-on voltage to a plurality of gate lines of a display panel and by supplying a gamma signal to a plurality of data lines. The generating of the gamma reference voltage may include adjusting a voltage level of the reference voltage using an amplifier. A gain of the amplifier is controlled by a resistor with an adjustable resistance based on the gamma control signal.

BRIEF DESCRIPTION OF THE DRAWINGS

Exemplary embodiments of the present invention can be understood in more detail from the following description taken in conjunction with the accompanying drawings, in which.

DETAILED DESCRIPTION OF EXEMPLARY EMBODIMENTS

Hereinafter, exemplary embodiments of the present invention will be described in detail with reference to the accompanying drawings. However, the present invention is not limited to the exemplary embodiments disclosed below and may be implemented into various forms.

Figure 1:
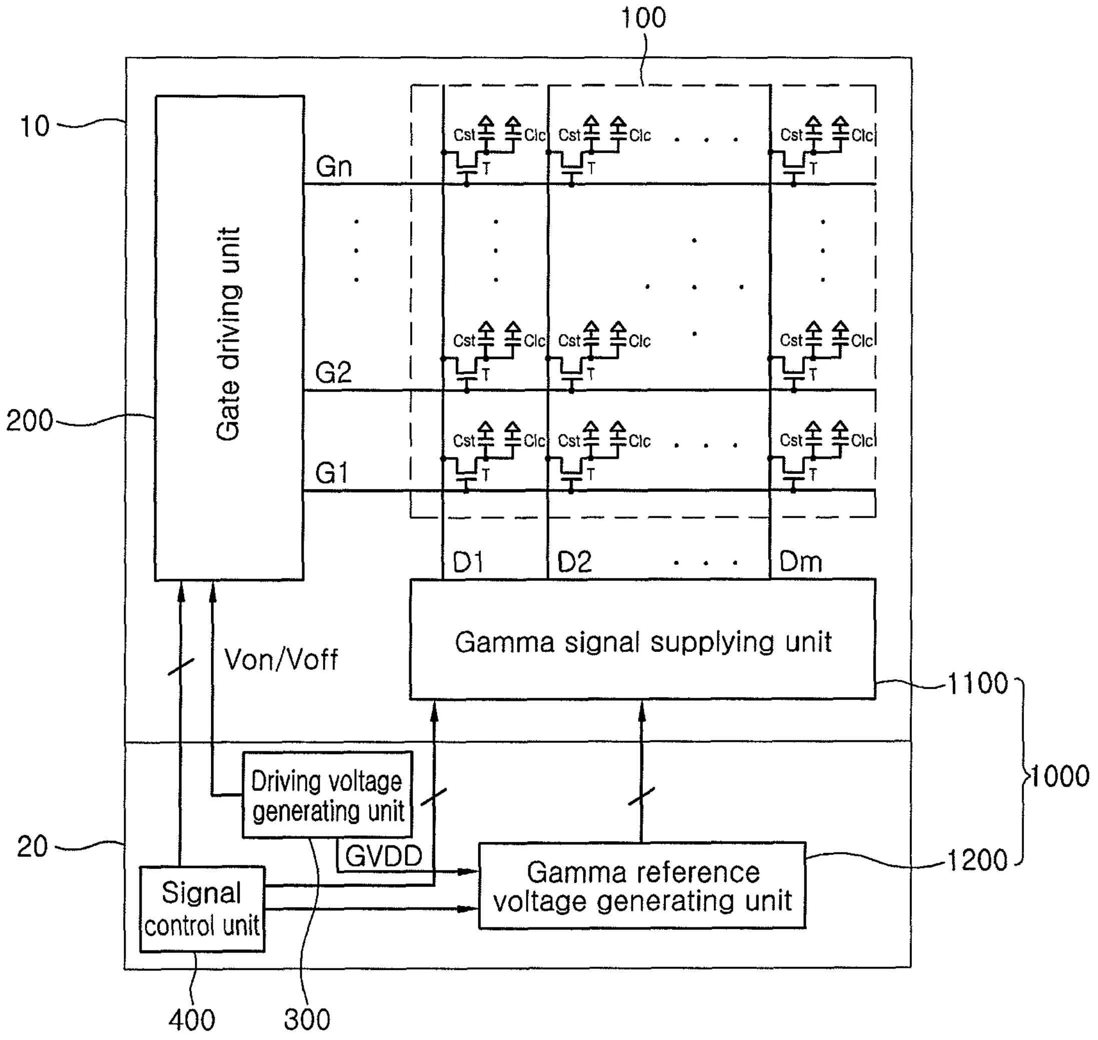
FIG. 1 is a block diagram illustrating a liquid crystal display device according to an exemplary embodiment of the present invention.
Figure 2:
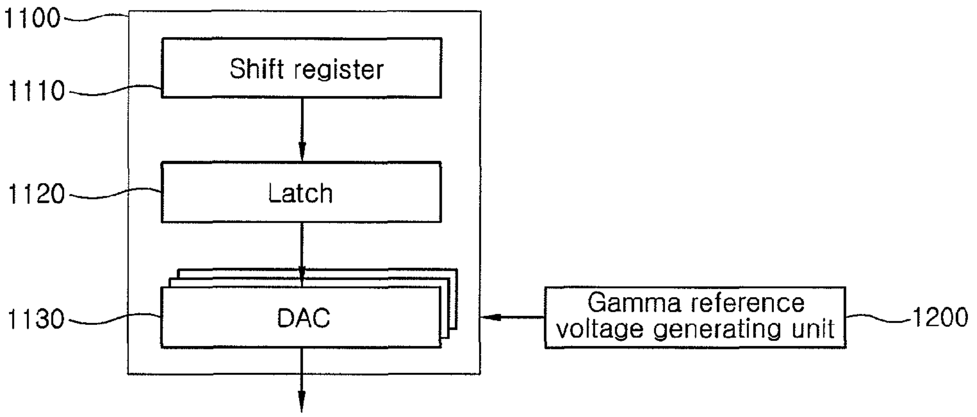
FIGS. 2 and 3 are block diagrams illustrating source driving units according to exemplary embodiments of the present invention.
Figure 3:
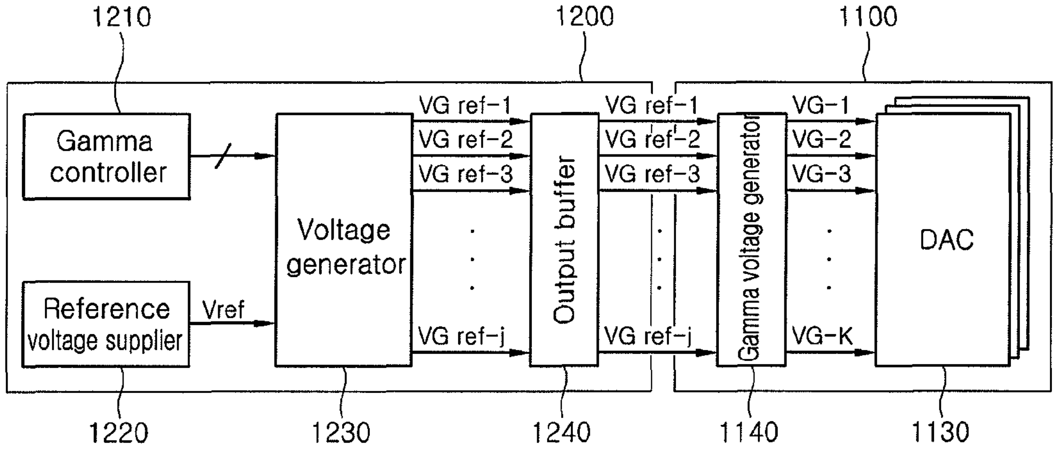
Figure 4:
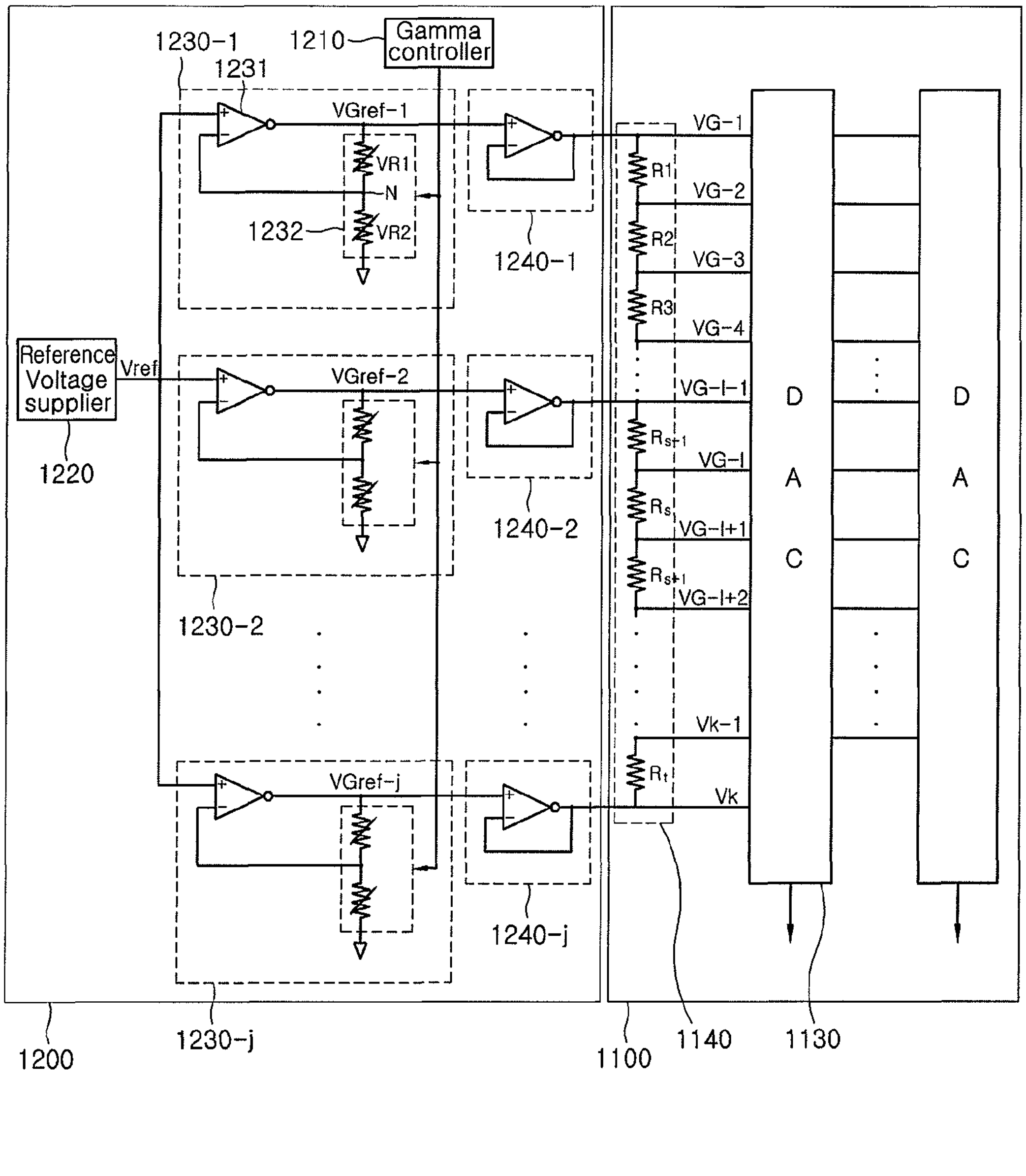
FIG. 4 is a schematic circuit diagram illustrating a source driving unit according to an exemplary embodiment of the present invention.
Figure 5:
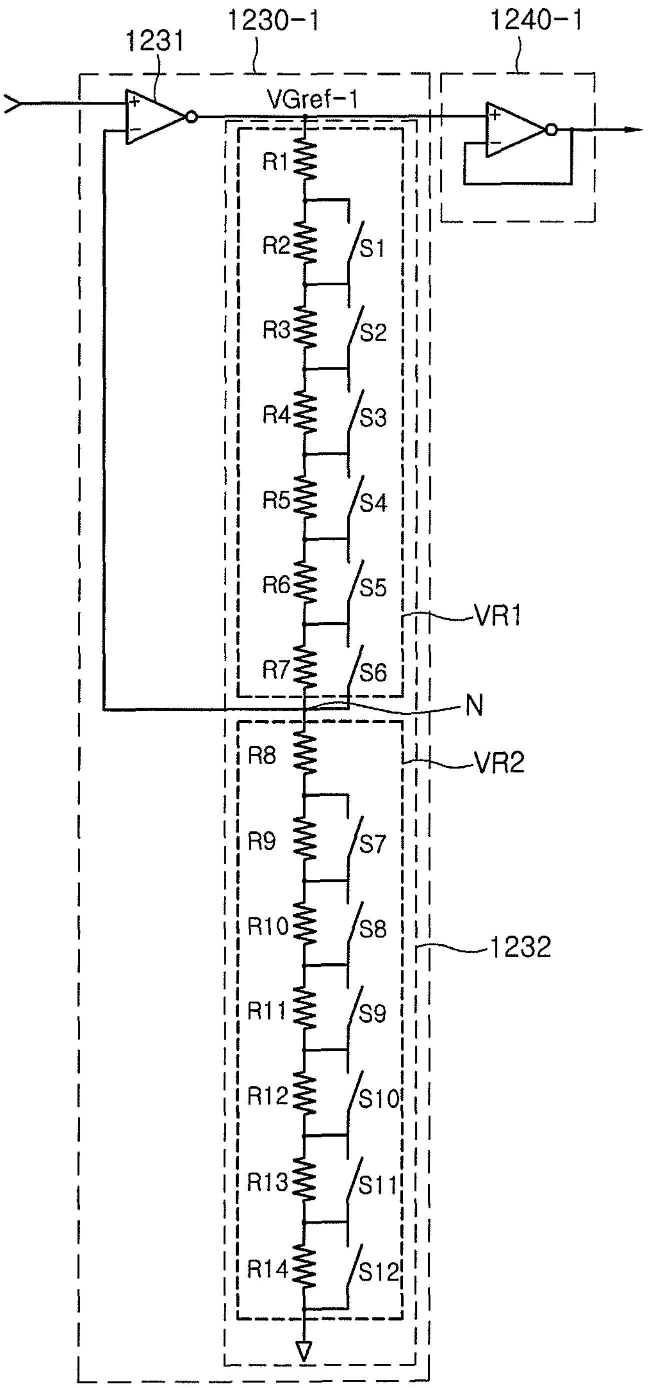
FIG. 5 is a circuit diagram illustrating a voltage generator according to an exemplary embodiment of the present invention.
Figure 6:
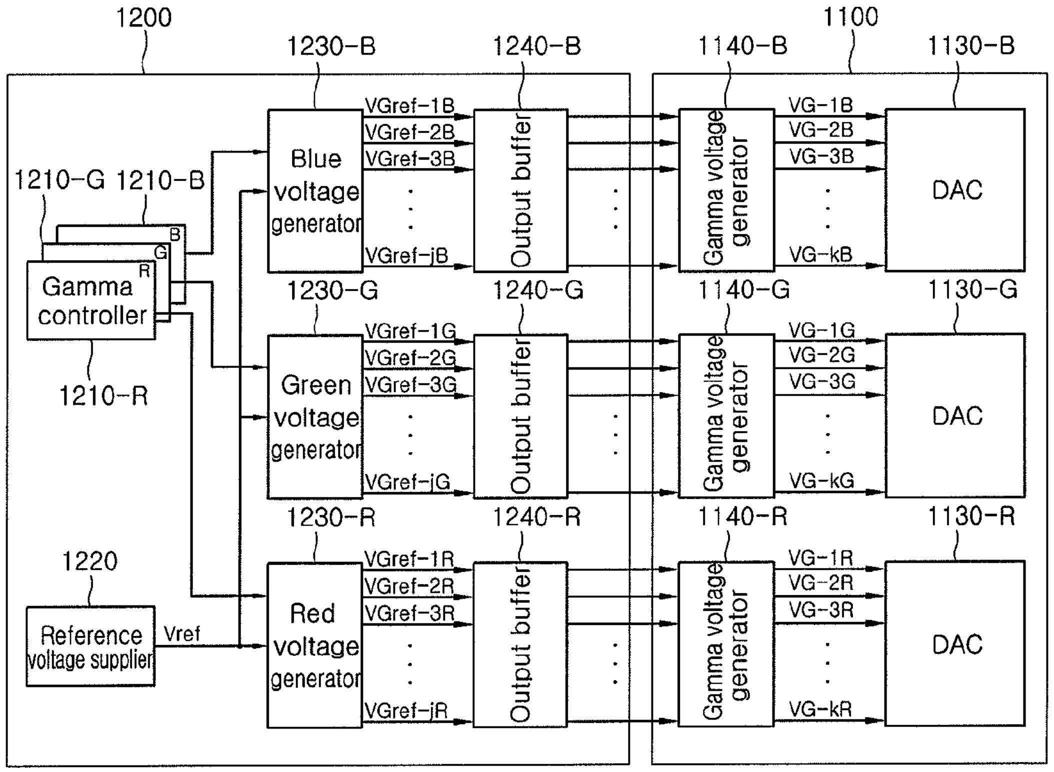
FIG. 6 is a block diagram illustrating gamma voltage control in a source driving unit according to an exemplary embodiment of the present invention.

FIG. 1 is a block diagram illustrating a liquid crystal display device according to an exemplary embodiment of the present invention. FIGS. 2 and 3 are block diagrams illustrating source driving units according to exemplary embodiments of the present invention. FIG. 4 is a schematic circuit diagram illustrating a source driving unit according to an exemplary embodiment of the present invention. FIG. 5 is a circuit diagram illustrating a voltage generator according to an exemplary embodiment of the present invention. FIG. 6 is a block diagram illustrating gamma voltage control in a source driving unit according to an exemplary embodiment of the present invention.

Referring to FIGS. 1 to 5, the display device includes an image display unit 100, a gate driving unit 200, a data driving unit 1000, a driving voltage generating unit 300, and a signal control unit 400.

The image display panel 100 includes a plurality of gate lines G1 to Gn extending in one direction, and a plurality of data lines D1 to Dm extending in a direction intersecting the gate lines. The display panel 100 further includes pixels. Each pixel includes a thin film transistor T, and a liquid crystal capacitor Clc. Each pixel may include a storage capacitor Cst. The pixels represent red (R), green (G), and blue (B) colors, which may be combined to display natural colors. The thin film transistor T may be fabricated through an LTPS process.

As shown in FIG. 1, the image display unit 100 is formed in a display panel 10. Although not shown, the display panel 10 includes upper and lower transparent substrates.

The lower substrate of the display panel 10 includes the thin film transistors T, the gate lines G1 to Gn, the data lines D1 to Dm, and pixel electrodes for the liquid crystal capacitor Clc. The upper substrate includes a black matrix, a color filter, and a common electrode for the liquid crystal capacitor Clc. The black matrix may be formed over an entire area excluding the image display unit 100. This black matrix can prevent light loss through the area excluding the image display unit 100. A liquid crystal layer is provided between the pixel electrode and the common electrode.

A control unit including the gate driving unit 200, the data driving unit 1000, the driving voltage generating unit 300, and the signal control unit 400 is disposed external to the image display unit 100. The control unit supplies driving signals to the image display unit 100, so that the image display unit 100 displays an image by receiving external light. The units in the control unit may be fabricated using a variety of circuit elements including thin film transistors. Some of the above units in the control unit may be fabricated together with the display panel 10 when fabricating the image display unit 100 to reduce manufacturing costs. The other units in the control unit may be fabricated as a single IC chip or discrete IC chips. The gate driving unit 200 and the gamma signal supplying unit 1100 of the data driving unit 1000 are integrated into the display panel 10, as shown in FIG. 1. The driving voltage generating unit 300, the signal control unit 400, and a gamma reference voltage generating unit 1200 of the data driving unit 1000 may be mounted as chips on an additional printed circuit board 20.

The signal control unit 400 receives image signals, such as red, green, and blue pixel data input from an external graphic controller (not shown), and control signals for controlling the display thereof, such as a vertical synchronization signal Vsync, a horizontal synchronization signal Hsync, a main clock CLK, a data enable signal DE, etc. The signal control unit 400 processes the pixel data in accordance with an operational condition of the image display panel 100. The pixel data signals are rearranged in accordance with an arrangement of the pixels in the image display unit 100. The signal control unit 400 generates a gate driving unit control signal and a data driving unit control signal, and sends the gate driving unit control signal to the gate driving unit 200. The gate driving unit control signal includes a vertical synchronization start signal for indicating when to start output of the gate turn-on voltage Von, a gate clock signal, and an output enable signal. The data driving unit control signal includes a synchronization start signal for indicating when to start transfer of the pixel data, a load signal for instructing application of a data voltage to a corresponding data line, and a data clock signal. The data driving unit control signal may further include an inversion signal for inverting the polarity of a gradation voltage relative to a common voltage. The signal control unit 400 may be fabricated in the form of an IC chip and mounted on the printed circuit board 20. Although not shown, the signal control unit 400 may be electrically connected to the gate driving unit 200 via a flexible printed circuit board which is connected to the printed circuit board 20.

The driving-voltage generating unit 300 generates a variety of driving voltages required for driving the display device using external power input from an external power supply. The driving-voltage generating unit 300 generates a reference voltage GVDD, a gate turn-on voltage Von, a gate turn-off voltage Voff, and a common voltage for common electrode. In response to the control signal from the signal control unit 400, the driving-voltage generating unit 300 applies the gate turn-on voltage Von and the gate turn-off voltage Voff to the gate driving unit 200 and applies the reference voltage GVDD to the data driving unit 1000. The reference voltage GVDD is used as a reference voltage for generating a gamma signal to drive the liquid crystal.

In response to the control signal, the gate driving unit 200 sequentially applies the gate turn on/off voltages Von/Voff from the driving-voltage generating unit 300 to the gate lines G1 to Gn. Each thin film transistor T can be controlled so that a gradation voltage is applied to a corresponding pixel. The gate driving unit 200 may be fabricated together with the image display unit 10. The gate driving unit 200 includes a plurality of stages respectively connected to the gate lines G1 to Gn of the image display unit 10. The plurality of stages sequentially supplies the gate turn-on voltage to the gate lines G1 to Gn.

The data driving unit 1000 includes the gamma reference voltage generating unit 1200 for generating a gamma reference voltage, and the gamma signal supplying unit 1100 for applying a gamma signal to the plurality of data lines based on the gamma reference voltage and the pixel data.

As shown in FIG. 1, the gamma signal supplying unit 1100 is disposed on the display panel 10. The gamma signal supplying unit 1100 includes a shift register 1110, a latch 1120, and a plurality of digital-to-analog converters (DACs) 1130, as shown in FIG. 2. The gamma signal supplying unit 1100 further includes a gamma voltage generator 1140 for generating the gamma voltage using the reference gamma voltage, as shown in FIG. 3. The gamma voltage generator 1140 may be fabricated integrally with the DACs 1130. Although not shown, the gamma signal supplying unit 1100 may further include a data register for temporarily storing the sequentially input pixel data.

The shift register 1110 generates a sampling signal in response to the control signal supplied from the signal control unit 400 and supplies the generated sampling signal to the latch 1120. The latch 1120 samples and latches the pixel data according to the sampling signal. The latch 1120 simultaneously latches pixel data corresponding to the respective data lines D1 to Dm. The DACs 1130 convert the digital pixel data output from the latches 1120 into gamma signals using the gamma voltage. Then, the DACs 1130 output the gamma signals to the corresponding data lines D1 to Dm.

The shift register 1110, the latches 1120, and the DACs 1130 are formed on the display panel 10. Circuit elements of these units are fabricated on the lower substrate of the display panel 10. This eliminates a need for fabricating the gamma signal supplying unit 1100, which converts the external pixel data into the gamma signal and supplies the gamma signal to the data lines D1 to Dm, in the form of an additional IC chip, so that an additional process of fabricating such an expensive IC chip may not be required. In addition, a process of mounting the IC chip on the display panel 10 can also be omitted, thereby preventing yield reduction by a mounting defect of the IC chip on the display panel 10.

The gamma reference voltage generating unit 1200 for generating the gamma reference voltage may be fabricated separately from the gamma signal supplying unit 1100 in the form of a separate chip. The gamma reference voltage generating unit 1200 in the form of a separate chip may be mounted on the separate printed circuit board 20 and electrically connected to the gamma signal supplying unit 1100. The gamma reference voltage generating unit 1200 may be connected to the gamma signal supplying unit 1100 via wiring of the printed circuit board 20, wiring of the flexible printed circuit board, and internal wiring of the display panel 10. Alternately, the gamma reference voltage generating unit 1200 may be mounted on the display panel 10 and connected to the gamma signal supplying unit 1100 via the internal wiring of the display panel 10.

Fabricating the gamma reference voltage generating unit 1200 in the form of an IC chip through a separate fabricating process increases the reliability of the gamma reference voltage. If the gamma reference voltage generating unit 1200 is fabricated together with the image display unit 100 of the display panel 10, thin film transistors formed through a low-temperature poly silicon process are used as transistors in the gamma reference voltage generating unit 1200. As described above, thin film transistors formed through the LTPS process have nonuniform threshold voltage and carrier mobility. Accordingly, the gamma reference voltage generating unit 1200 does not provide a stable gamma reference voltage. The gamma reference voltage generating unit 1200 may be fabricated using transistors formed of high-temperature monocrystalline silicon, thereby generating a stable gamma reference voltage.

The gamma reference voltage generating unit 1200 may be fabricated in the form of a separate chip to enable the data driving unit 1000 to be employed in various display devices having different gamma voltages. The voltage level of the gamma reference voltage may then be adjusted using a predetermined control signal based on the corresponding display device.

As shown in FIG. 3, the gamma reference voltage generating unit 1200 includes a gamma controller 1210, a reference voltage supplier 1220, a voltage generator 1230, and an output buffer 1240. The gamma controller 1210 outputs a plurality of gamma control signals for controlling the output of the voltage generator 1230. The gamma controller 1210 is fabricated in the form of a programmable register to continuously output a programmed value. However, the present invention is not limited thereto, as the gamma controller 1210 may output a variable value dependent on the control signal from the control unit 400. The gamma controller 1210 receives a predetermined control value via an $I^2C$ serial interface. The gamma controller 1210 can be omitted, if necessary. For example, the gamma controller 1210 can be omitted when the signal control unit 400 provides the gamma control signal or when the output of the voltage generator 1230 is not variable.

The reference voltage supplier 1220 provides the reference voltage Vref to the voltage generator 1230. The reference voltage supplier 1220 generates the reference voltage Vref using external power and outputs the generated reference voltage Vref. However, the present invention is not limited thereto. The reference voltage may be supplied from the driving voltage generating unit 300 to the voltage generator 1230, thereby enabling the reference voltage supplier 1220 to be omitted.

The voltage generator 1230 generates a plurality of gamma reference voltages VGref-1 to VGref in response to the gamma control signal from the gamma controller 1210 and the reference voltage Vref from the reference voltage supplier 1220. The output buffer 1240 provides the plurality of gamma reference voltages VGref-1 to VGref to the gamma signal supplying unit 1100.

The voltage generator 1230 includes a plurality of voltage generators 1230-1 to 1230-*j* for outputting the gamma reference voltages VGref-1 to VGref having different voltage levels, as shown in FIGS. 4 and 5. Each of the voltage generators 1230-1 to 1230-*j* includes an amplifier 1231 for changing the level of the reference voltage Vref of the reference voltage supplier 1220, and a gain controller 1232 for controlling the gain of the amplifier 1231 in response to the gamma control signal of the gamma controller 1210.

An OP amplifier may be used as the amplifier 1231 as shown in FIGS. 4 and 5. Two variable resistors VR1 and VR2 connected in series may be used for the gain controller 1232. The voltage generator 1230 includes an OP amplifier and the first and second variable resistors VR1 and V2. The OP amplifier has a non-inversion input terminal (+) for receiving the reference voltage Vref and an output terminal connected to the output buffer 1240. The first and second variable resistors VR1 and VR2 are connected in series between the output terminal of the OP amplifier and the ground and have resistances that can be adjusted in response to the gamma control signal. The inversion input terminal (−) of the OP amplifier is connected to a connection node N between the first and the second variable resistors VR1 and VR2. The output of the voltage generator 1230 is determined by a resistance ratio of the first to the second variable resistors VR1 and VR2. When the output voltage of the voltage generator 1230 is VGref, the reference voltage is Vref, the resistance of the first variable resistor is VR1, the resistance of the second variable resistor is VR2, and the output voltage of the voltage generator can be calculated by Equation 1 as follows:

$$VGref = Vref\left(1 + \frac{VR1}{VR2}\right) \quad \text{(Equation 1)}$$

For example, when the first variable resistor VR1 and the second variable resistor VR2 have the same resistance, the output of the voltage generator is twice the reference voltage Vref. The first variable resistor VR1 includes first to seventh resistors R1 to R7 connected in series, and first to sixth switches S1 to S6 respectively connected in parallel to the second to seventh resistors R2 to R7 and operating in response to the gamma control signal, as shown in FIG. 5. The first to sixth switches S1 to S6 bypass the second to seventh resistors R2 to R7 in response to the gamma control signal.

The second variable resistor VR2 includes eighth to fourteenth resistors R8 to R14 connected in series, and seventh to twelfth switches S7 to S12 respectively connected in parallel to the ninth to fourteenth resistors R9 to R14 and operating in response to the gamma control signal, as shown in FIG. 5. The seventh to twelfth switches S7 to S12 bypass the ninth to fourteenth resistors R9 to R14 in response to the gamma control signal.

Although FIG. 5 shows seven resistors and six switches in each of the variable resistor VR1 and VR2, this is merely an exemplary embodiment of the present invention, as the number resistors and switches may increased or decreased. Since the switches are turned on and off independently, the gamma control signal for controlling the switches may have a bit number equal to the number of the switches. For example, when twelve switches are used as in FIG. 5, a 12-bit gamma control signal may be represented. Each of the switches may be embodied as transistors.

The resistance of the first variable resistor VR1 can be changed according to the gamma control signal from the gamma controller 1210. For example, when all the switches are turned off, the resistance of the first variable resistor VR1 is equal to a sum of the first to seventh resistors R1 to R7 (VR1=R1+R2+R3+R4+R5+R6+R7). When the first switch S1 is turned on, the second resistor R2 is bypassed and the resistance of the first variable resistor VR1 is a sum of the resistances except for the second resistor R2 (VR1=R1+R3+R4+R5+R6+R7). When the output voltage of the voltage generator 1230 is VGref, the reference voltage is Vref, a minimum output voltage difference between the voltage generators is a, and the resistance of the resistors bypassed in the first variable resistor VR1, (i.e., the second to seventh resistors R2 to R7) can be calculated by Equation 2 as follows:

$$R(p+2) = \left(\frac{VGref + a\cdot 2^{p}}{Vref} - 1\right)\cdot R8 - R1 \quad \text{(Equation 2)}$$

where p denotes an integer number from 0 to 5.

The resistance of the resistors bypassed in the second variable resistor VR2 (i.e., the ninth to fourteenth resistors R9 to R14) can be calculated by Equation 3 as follows:

$$R(q+3) = \frac{R1}{\frac{VGref - a\cdot 2^{q-6}}{Vref} - 1} - R8 \quad \text{(Equation 3)}$$

where q denotes a natural number from 6 to 11.

Accordingly, the resistances of the first and second variable resistors VR1 and VR2 can be determined from the output voltage of the voltage generator 1230 and a controllable voltage range (i.e., a voltage difference) of the voltage generator 1230.

When the switches are embodied as transistors, the resistances of the first and the second variable resistors VR1 and VR2 may be adjusted depending on the resistances of the transistors. The resistance of each transistor needs to be much smaller than that of the resistor connected in parallel with the transistor. If the transistor used as the switch has a high resistance, the resistance of the resistor connected in parallel with the transistor should be increased so that the effect of the high resistance of the transistor is negligible. The resistance of the resistor can be increased by increasing the volume occupied by the resistor. Increasing the volume occupied by the resistor also increases the size of the chip. The switch may be used as a transmission gate including NMOS and PMOS transistors connected in parallel with each other. The transistors may be fabricated to have a large length to extent ratio so that the resistance can be 1 kohm or less.

When the circuit for generating a gamma reference voltage is fabricated as a separate chip, the driving capability of the device is improved and the number of analog amplifiers, such as OP amplifiers, is reduced as compared to the circuit being integrated into the display panel. The variable resistors for generating the gamma reference voltage can be precisely controlled according to characteristics of the panel by setting an 8 to 24-bit register. Since the output of the variable resistor is determined by the resistors connected in series, the output is not significantly affected by a temperature or process change.

Figure 7:
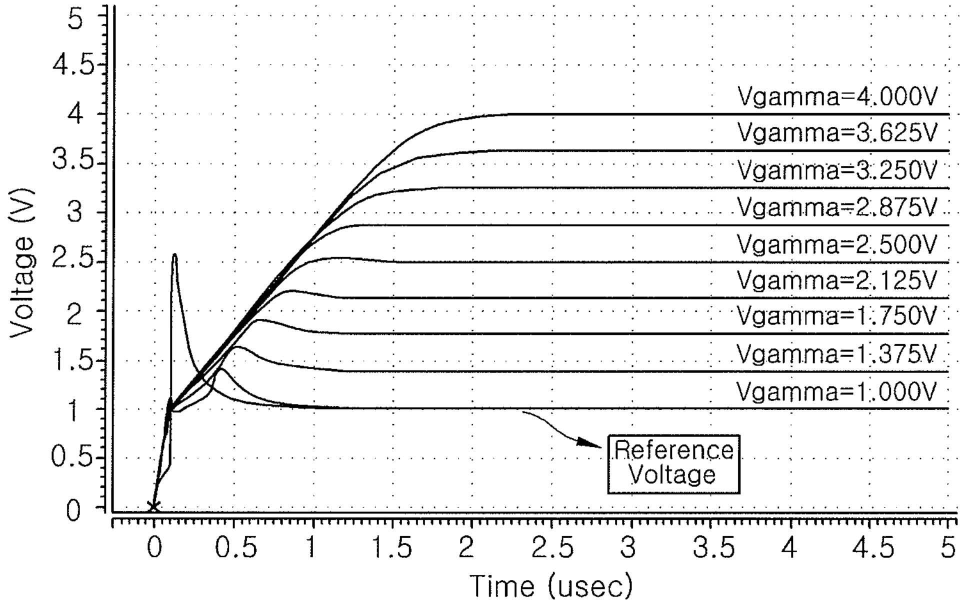
FIG. 7 is a graph illustrating a simulation result of an operation of a gamma reference voltage generating unit according to an exemplary embodiment of the present invention.

FIG. 7 is a graph illustrating a simulation result for an operation of a gamma reference voltage generating unit according to the exemplary embodiment of the present invention. The gamma reference voltage generating unit includes nine voltage generators, each of which is based on the voltage generator 1230 of FIG. 5. Nine gamma reference voltages VGref having an exact voltage difference of 375 mV are generated. The voltage difference can be adjusted depending on the number and the resistance of the resistors in the voltage generator 1230.

The gamma reference voltages VGref-1 to VGref output from the voltage generators 1230-1 to 1230-*j* are supplied to the gamma signal supplying unit 1100 via the output buffer 1240. As shown in FIGS. 4 and 5, a unit gain amplifier or a unit gain buffer may be used as the output buffer 1240.

Then, the plurality of gamma reference voltages VGref-1 to VGref supplied to the gamma signal supplying unit 1100 are divided into a plurality of gamma voltages VG-1 to VG-K by the gamma voltage generator 1140, as shown in FIGS. 3 and 4. The gamma voltage generator 1140 generates a plurality of gamma voltages VG-1 to VG-K by dividing between the respective gamma reference voltages VGref-1 to VGref using resistors. For example, when the input gamma reference voltages VGref-1 to VGref-3 are respectively 1V, 2V, and 3V, the gamma voltage generator 1140 generates a plurality of gamma voltages (e.g., 1.3V, 1.6V and 1.8V) by dividing between 1V and 2V using resistors, and generates a plurality of gamma voltages (e.g., 2.2V, 2.5V and 2.7V) by dividing between 2V and 3V using resistors.

The gamma voltage generator 1140 includes a plurality of resistors R1 to Rt for dividing the gamma reference voltages VGref-1 to VGref. The resistors R1 to Rt are respectively connected between a plurality of input terminals for receiving the plurality of gamma reference voltages VGref-1 to VGref. The resistors R1 to Rt are connected in series.

The number of the resistors is not limited, but varies according to voltage levels of the output gamma voltages VG-1 to VG-k. For example, the gamma voltage generator 1140 can use 63 resistors to generate 64 levels of the gamma voltages VG-1 to VG-k. The resistors may be fixed resistors, of which the resistance does not vary. The gamma voltages VG-1 to VG-k having a variety of voltage levels can be generated by controlling the resistance of resistors in the gamma voltage generator 1140.

Figure 8:
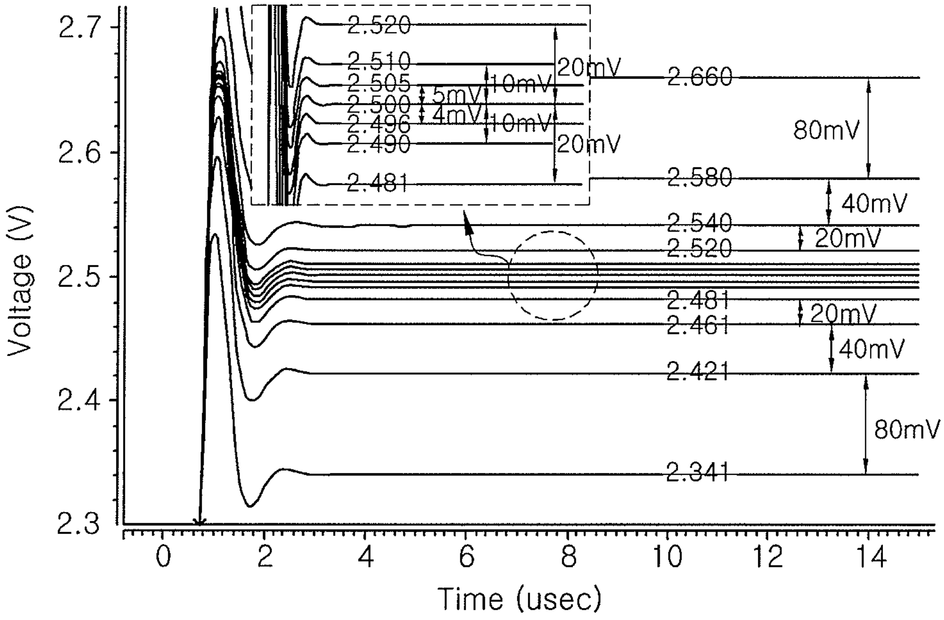
FIG. 8 is a graph illustrating a simulation result of an operation of a gamma voltage generator according to an exemplary embodiment of the present invention.

FIG. 8 is a graph illustrating a simulation result for a gamma voltage generator according to an exemplary embodiment of the present invention. The graph illustrates the simulation result for an operation of the gamma voltage generator when a plurality of gamma reference voltages VGref-1 to VGref is supplied from a gamma reference voltage generating unit 1200. About 13 gamma voltages are generated, each having a minimum voltage difference of 5 mV and a maximum voltage difference of 80 mV. The voltage difference between the adjacent gamma voltages can be adjusted up to a predetermined limit, such as 160 mV. However, the voltage difference between the adjacent gamma voltages is not limited thereto, as the voltage difference may be variously changed depending on the resistance of the gamma voltage generator 1140.

The gamma voltages VG-1 to VG-k are provided to the digital-to-analog converter 1130. The digital-to-analog converter 1130 provides a gamma voltage, as a gamma signal, corresponding to the applied digital signal to the data lines or channels.

While exemplary embodiments of the present invention have been described as having one voltage generator 1230 included in one gamma reference voltage generating unit 1200, the present invention is not limited thereto. For example, a plurality of voltage generators 1230 may be provided in one gamma reference voltage generating unit 1200. When gamma voltages for representing red, green, and blue are different from each other, the gamma reference voltage generating unit may include a blue voltage generator 1230-B, a green voltage generator 1230-G, and a red voltage generator 1230-R, as shown in FIG. 6. The blue, green and red voltage generators 1230-B, 1230-G and 1230-R respectively output blue, green, and red gamma reference voltages. Three gamma controllers 1210 may be provided for supplying the gamma control signal to the blue, green and red voltage generators 1230-B, 1230-G, and 1230-R. For example the gamma reference voltage generating unit 1200 may include a gamma controller 1210-B for supplying a first gamma control signal to the blue voltage generator 1230-B, a gamma controller 1210-G for supplying a second gamma control signal to the green voltage generator 1230-G, and a gamma controller 1210-R for supplying a third gamma control signal to the red voltage generator 1230-R, as shown in FIG. 6.

Three output buffers 1240-B, 1240-G and 1240-R may also be provided for transferring the output of the blue, green and red voltage generators 1230-B, 1230-G and 1230-R. The gamma signal supplying unit 1100 includes three gamma voltage generators 1140-B, 1140-G, and 1140-R and three digital-to-analog converters 1130-R, 1130-G, and 1130-R, as shown in FIG. 6.

Although the present invention has been described in connection with the accompanying drawings and the exemplary embodiments, it will be understood by those skilled in the art that various modifications and changes can be made thereto without departing from the spirit and scope of the invention.

What is claimed is:

1. A display device, comprising:

a lower substrate including pixel electrodes;

an upper substrate including a common electrode; and a gamma reference voltage generating unit for generating a plurality of gamma reference voltages in response to a gamma control signal; and a gamma signal supplying unit providing a gamma signal to data lines of the lower substrate of a display panel using the gamma reference voltages, wherein the gamma reference voltage generating unit is fabricated as a chip and mounted on an external printed circuit board physically separated from the lower substrate and electrically connected to the lower substrate, wherein the gamma signal supplying unit is located on the lower substrate and receives the plurality of gamma reference voltages from the gamma reference voltage generating unit located in the external printed circuit board, wherein the gamma reference voltage generating unit comprises:

a gamma controller for supplying the gamma control signal;

at least one voltage generator for outputting different gamma reference voltages based on a reference voltage and the gamma control signal; and at least one output buffer for outputting the plurality of gamma reference voltages, wherein the gamma signal supplying unit includes a digital to analog converter for performing a digital to analog conversion on digital pixel data into the gamma signal using the gamma reference voltages and outputting the gamma signal to the data lines.

2. The display device as claimed in claim 1, further comprising a reference voltage supplier for supplying the reference voltage.

3. The display device as claimed in claim 1, wherein the output buffer is a unit gain buffer.

4. The display device as claimed in claim 1, wherein the voltage generator comprises:

an amplifier for changing a voltage level of the reference voltage; and a gain controller for controlling a gain of the amplifier in response to the gamma control signal.

5. The display device as claimed in claim 1, wherein the voltage generator comprises:

an amplifier including a non-inversion input terminal for receiving the reference voltage and an output terminal for outputting the gamma reference voltage; and a gain controller for controlling a gain of the amplifier in response to the gamma control signal comprising first and second variable resistors connected between a ground and the output terminal of the analog amplifier and having resistances adjusted in response to the gamma control signal, wherein the amplifier further includes an inversion input terminal connected to a connection node between the first and second variable resistors.

6. The display device as claimed in claim 5, wherein each of the first and the second variable resistors comprises:

a plurality of resistors connected in series; and a plurality of switches connected in parallel to at least one of the plurality of resistors, the switches being turned on and off in response to the gamma control signal.

7. A display device, comprising:

a display panel including a plurality of gate lines and a plurality of data lines;

a gate driver for sequentially supplying a gate turn-on voltage to the plurality of gate lines;

a source driver including a gamma reference voltage generating unit for generating a plurality of gamma reference voltages in response to a gamma control signal, and a gamma signal supplying unit located in the display panel and providing a gamma signal to the plurality of data lines using the gamma reference voltages; and a signal control unit for receiving pixel data and driving the gate driver and the source driver; and a driving voltage generating unit for supplying driving voltages to the gate driver and source driver, wherein the gamma reference voltage generating unit is fabricated as a chip and mounted on a printed circuit board physically separated from the display panel and electrically connected to the display panel, wherein the display panel comprises:

a lower substrate having the plurality of gate lines and the plurality of data lines, a plurality of thin film transistors connected to the gate and data lines, and pixel electrodes connected to the plurality of thin film transistors;

an upper substrate having a common electrode facing the pixel electrodes; and a liquid crystal layer interposed between the lower substrate and the upper substrate, and wherein the gate driver and the gamma signal supplying unit are formed on the lower substrate, wherein the gamma signal supplying unit includes a digital to analog converter for performing a digital to analog conversion on the digital pixel data into the gamma signal using the gamma reference voltages and outputting the gamma signal to the data lines.

8. A method of forming a display, the method comprising:

forming a lower substrate on a display panel, the lower substrate having a plurality of gate lines and a plurality of data lines, a plurality of thin film transistors connected to the gate and data lines, and pixel electrodes connected to the plurality of thin film transistors;

forming an upper substrate having a common electrode facing the pixel electrodes;

forming a liquid crystal layer interposed between the lower substrate and the upper substrate;

forming a gate driver and a gamma signal supplying unit of a source driver on the lower substrate; and forming a gamma reference voltage generating unit of the source driver on a printed circuit board physically separated from the lower substrate and electrically connected to the lower substrate of the display panel, wherein the gamma reference voltage generating unit provides a gamma reference voltage to the gamma signal supplying unit, and wherein the gamma signal supplying unit provides a gamma signal to the data lines using the gamma reference voltage, wherein the gamma signal supplying unit includes a digital to analog converter for performing a digital to analog conversion on digital pixel data into the gamma signal using the gamma reference voltage and outputting the gamma signal to the data lines.

9. The method of claim 8, wherein forming the gamma reference voltage generating unit comprises fabricating the reference voltage generating unit using a high-temperature monocrystalline silicon process.

10. The method of claim 9, wherein the display panel is fabricated using a low-temperature poly silicon process.

11. The method of claim 8, wherein the gamma reference voltage generating unit is configured to generate the gamma reference voltage based on a reference voltage and a gamma control signal.

12. The display device as claimed in claim 1, wherein the gamma reference voltage generating unit includes transistors formed of high-temperature monocrystalline silicon.

13. The display device as claimed in claim 7, wherein the gamma reference voltage generating unit includes transistors formed of high-temperature monocrystalline silicon and the display panel includes transistors formed of low-temperature poly silicon.

* * * * *